United States Patent [19]
Wong

[11] 4,254,667
[45] Mar. 10, 1981

[54] SAFETY THROTTLE FOR POWER TOOLS

[75] Inventor: Daniel T. Wong, Columbia, S.C.

[73] Assignee: Rockwell International Corporation, Pittsburgh, Pa.

[21] Appl. No.: 9,456

[22] Filed: Feb. 5, 1979

[51] Int. Cl.[3] .......................... G05G 1/04; B23B 45/00
[52] U.S. Cl. ....................................... 74/526; 173/170; 251/109
[58] Field of Search .......................... 74/526, 565, 566; 251/98, 99, 107, 109; 173/170

[56] References Cited

U.S. PATENT DOCUMENTS

| | | | |
|---|---|---|---|
| 3,838,662 | 10/1974 | McCalister | 74/526 |
| 4,016,684 | 4/1977 | Urda | 74/526 |
| 4,018,292 | 4/1977 | Roll et al. | 173/170 |

FOREIGN PATENT DOCUMENTS

| | | | |
|---|---|---|---|
| 473083 | 3/1929 | Fed. Rep. of Germany | 173/170 |

*Primary Examiner*—Kenneth Dorner

[57] ABSTRACT

A safety interlock for power tools for preventing inadvertent operation of the tool; the interlock must be moved before the tool control throttle can be actuated.

3 Claims, 3 Drawing Figures

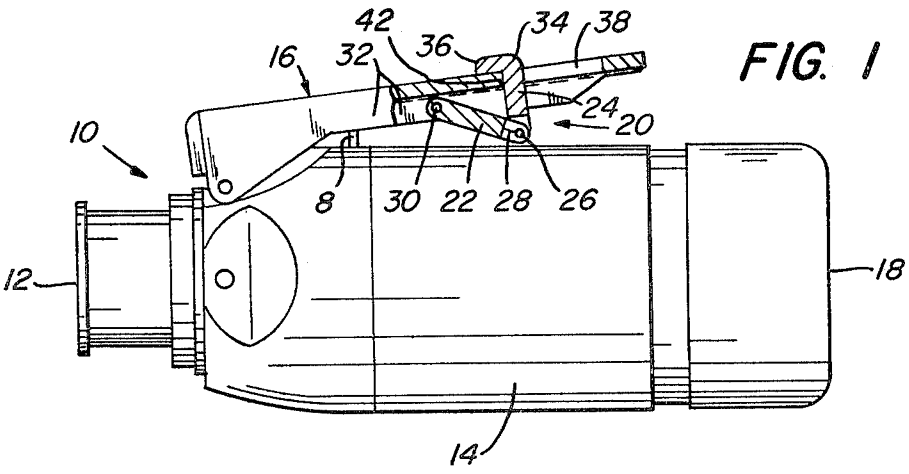
FIG. 1
FIG. 2
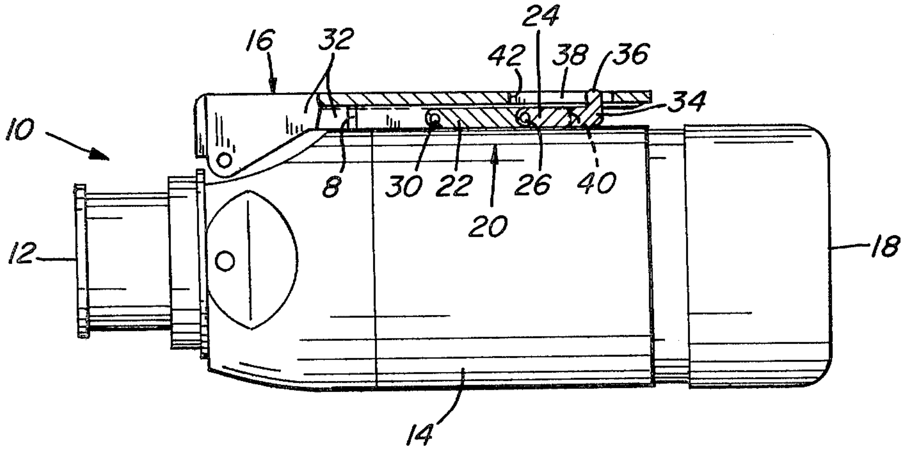
FIG. 3
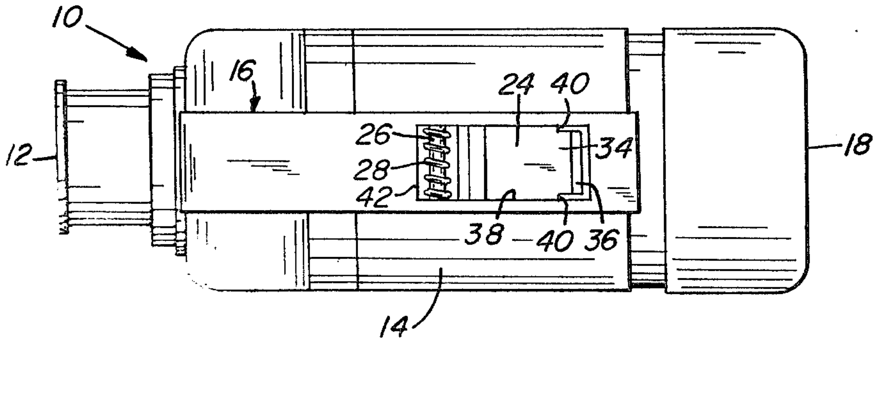

SAFETY THROTTLE FOR POWER TOOLS

BACKGROUND OF THE INVENTION

Throttle-type control levers for the graduated delivery of power to hand-held tools, especially pneumatic tools, have long been used on certain types of tools where variable speeds and/or power delivery have been desired. Grinders, sanders, nutrunners and screw drivers are examples of these tools. Usually, the throttle extends roughly parallel to the longitudinal axis of the handle, or the body of the tool when the tool is small enough to be held in the hand. In some larger tools, the throttle is mounted on a handle. The operator grips the handle (or tool body) with the ends of one or more fingers on the throttle. By closing or opening his fingers, the operator can provide varying amounts of pneumatic fluid to the motor, thus controlling the operation of the tool. The throttle is biased in a suitable manner, depending on the construction of the tool, to shut off upon release by the operator.

All the above is old in the art. A need for a "lockout", or safety interlock, to avoid inadvertent actuation of the tool, either by the operator in the act of picking up the tool or by accidental dropping or rolling the tool on to the throttle, has been observed, and the instant invention is one result.

SUMMARY OF THE INVENTION

It is a principal purpose of this invention to provide a safety throttle assembly for hand-held tools that prevents accidental actuation of the tool.

It is another important purpose of this invention to provide an assembly having a low profile to avoid accidental unlatching.

It is a further purpose of this invention to provide a safety latch that is readily accessible to the operator, yet folds under the trigger out of the way when the tool is in operation.

It is yet another purpose of this invention to provide a positive-acting, rugged, dependable safety latch combination which is at the same time economical, easy to manufacture and to assemble.

DESCRIPTION OF THE DRAWINGS

FIG. 1 is a side elevation of the body of an air tool with a portion of the trigger and safety latch in section;

FIG. 2 is a view similar to FIG. 1, with the trigger in the "on" position; and

FIG. 3 is a top view of the tool body with the trigger in the position of FIG. 2.

DESCRIPTION OF THE PREFERRED EMBODIMENT

Referring now to the figures, a hand-held air tool 10 with an air inlet connection 12 can be seen. The body 14 of the tool mounts an operating lever 16 of what is commonly called "throttle" design. The lever 16 usually controls a plunger 8 which, in turn, controls the supply of pneumatic fluid to a motor in body 14. The motor (not shown) is connected to any of a number of tool bits or grinders or the like (also not shown) which normally project axially from end 18 of tool body 14. All the above is well-known in the art.

The present invention is the incorporation of a safety latch 20 with operating lever 16 to prevent inadvertent operation of the tool. The safety latch has a pair of legs 22 and 24 disposed under throttle lever 16. The legs are connected by a pin 26 and are spring-biased by a coil spring 28 toward a closed position. The end of first leg 22 remote from its connection with second leg 24 is pivotally mounted on a pin 30 to the underside of lever 16. In this instance, the pin 30 is pivotally mounted in the downturned edges 32 (shown in FIGS. 1 and 2) of lever 16. The end 34 of leg 24 remote from its connection with leg 22 is provided with an L-shaped portion 36 projecting normally to the longitudinal axis of leg 24 in the direction in which it is biased by spring 28. End 34 is also reduced in lateral dimension to allow it to project through slot 38 in lever 16. The balance of leg 24 has a lateral dimension larger than slot 38, prohibiting complete passage of leg 24 through the slot. Shoulders 40 on either side of leg 24 connect the wider portion of leg 24 with end 34, and engage the under surface of throttle lever 16. Slot 38 is wide enough to allow L-shaped portion 36 of leg 24 to be wide enough for easy movement longitudinally by the thumb or a finger of the tool operator, but the slot must still be less wide than the lateral extent of shoulders 40. Slot 38 can be any length to allow proper longitudinal movement of the L-shaped projection 36 of leg 24, but the inner side 42 of slot 38 should be located to be a stop for end 34 of leg 24. This is positioned to allow leg 24 to form an included acute angle with leg 22, so that downward force on throttle lever 16 is ineffective to activate the tool, or to move leg 24, until the operator moves L-shaped portion 36 longitudinally along slot 38. Shoulders 40 are preferably rounded to allow downward pressure on lever 16 to move leg 24 to the position shown in FIGS. 2 and 3, after initially being manually moved a short distance by the tool operator.

Upon release of lever 16 by the operator, the lever moves to the position shown in FIG. 1, and spring 28 biases leg 24 to the position shown, against side 42. Thus, leg 24 becomes a blocking member, with one end against tool body 14 and shoulders 40 near the other end resting on the under side of lever 16, preventing accidental delivery of fluid to the tool motor.

While the foregoing specification has described a safety throttle mounted on the body of the tool, it should be realized that tools having a handle projecting from the body, on which the throttle control is designed to be mounted, such as a vertical grinder utilizing a cup-shaped grinding wheel, can also mount this type of safety throttle.

Accordingly, an efficient, economical, dependable safety throttle assembly is hereby disclosed, and accordingly, I claim:

1. A safety throttle assembly for use with powered tools having a motor and a motor housing, said assembly comprising:

(a) an operating lever having an elongated opening located adjacent one end thereof, said lever being pivotally attached to the main housing on the end opposite said slot; and (b) safety latch means associated with said operating lever whereby the tool throttle cannot be operated accidentally, said safety latch means including:

(i) a first leg pivotally connected at one end to said operating lever on that side facing the tool housing;

(ii) a second leg pivotally connected to the remaining end of said first leg, the outer end of said second leg opposite that and which is pivotally connected to said first leg being of less lateral dimension than the remainder of the leg so that said outer end can be received into the slot of said operating lever; and (iii) spring biasing means mounted on the hinged connection between said first and second legs to bias said second leg to a position of tool inoperativeness.

2. The assembly of claim 1 wherein the outer end of said second leg includes a portion that is angularly displaced from the remainder of said leg.

3. The assembly of claim 1 wherein the end of the elongated opening nearest to the pivoted connection of said lever to the tool housing provides stop means for the outer end of said second leg, whereby an acute angle is enclosed by said first and second legs when said tool is in operation.

* * * * *